(12) United States Patent
Shibata et al.

(10) Patent No.: US 6,769,925 B2
(45) Date of Patent: Aug. 3, 2004

(54) MALE CONNECTOR TERMINAL

(75) Inventors: Akira Shibata, Yamagata (JP); Yoshihito Otomo, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 21 days.

(21) Appl. No.: 10/101,710

(22) Filed: Mar. 21, 2002

(65) Prior Publication Data

US 2002/0137372 A1 Sep. 26, 2002

(30) Foreign Application Priority Data

Mar. 23, 2001 (JP) .................................... P2001-083966

(51) Int. Cl.[7] ................................................ H01R 4/66
(52) U.S. Cl. ...................... 439/101; 439/492; 439/329
(58) Field of Search ............................... 439/329, 422, 439/492, 494, 101

(56) References Cited

U.S. PATENT DOCUMENTS 3,966,295 A * 6/1976 Hyland et al. .............. 439/498
6,033,238 A * 3/2000 Fogg et al. ................. 439/108
6,604,966 B1 * 8/2003 Hayes et al. ................ 439/752

* cited by examiner

Primary Examiner—Tho D. Ta
Assistant Examiner—James R. Harvey
(74) Attorney, Agent, or Firm—Whitham, Curtis & Christofferson, P.C.

(57) ABSTRACT

A male connector is connected to a female connector which includes a plurality of terminal hole pairs, each having a signal terminal hole and an earth terminal hole which are arranged in a first direction. The plurality of terminal hole pairs are arranged on the female connector body in a second direction perpendicular to the first direction. The male connector includes a male connector body, a plurality of signal terminal pins and a plurality of earth terminal pins. The signal terminal pins are provided on the male connector body, and are accommodated in the signal terminal holes respectively. The plurality of earth terminal pins are provided on the male connector body, and are accommodated in the earth terminal holes. The earth terminal pins are smaller in number than the earth terminal holes of the female connector.

7 Claims, 2 Drawing Sheets

PRIOR ART

PRIOR ART

MALE CONNECTOR TERMINAL

BACKGROUND OF THE INVENTION

This invention relates to a male connector terminal used for connecting to a female connector terminal.

Floppy disk units (floptical disk units) have recently been extensively used as one of external memory units used for connecting to an information processing unit such as a computer unit. In such a floppy disk unit, a magnetic disk, comprising a flexible disk-like substrate having a magnetic coating formed on a main face thereof, is used as a recording medium, and the magnetic disk can be inserted into and ejected from the floppy disk unit.

Hence, one of component parts of the floppy disk unit is a connector terminal for communicating to a computer unit by transmitting and receiving signals which are to record on and read from a magnetic disk.

The connector terminal includes a plurality of terminal pairs each comprising a signal terminal and an earth terminal, and the plurality of terminal pairs are arranged in a direction perpendicular to the direction of arrangement of each pair of signal terminal and earth terminal. There are two types of such connector terminal, one of which is a female connector terminal having terminal holes corresponding to the signal terminals and the earth terminals, and the other is a male connector terminal having terminal pins corresponding to the signal terminals and the earth terminals.

Generally, a male connector terminal is provided in a floppy disk unit which is connected to a computer unit via a flat cable having female connector terminals provided respectively at both ends thereof.

As one construction of a related male connector, the related male connector terminal mounted on a floppy disk unit 10 as shown in FIG. 1 will be described.

A slot (not shown) for a floppy disk 20 is formed in a front face of a unit body 11 of the floppy disk unit 10. The floppy disk 20 can be inserted into and ejected from the floppy disk unit 10 through the slot. A reader/writer for the floppy disk 20, a signal processing circuit, and so on are provided within the unit body 11.

A power connector terminal 12, for supplying with power for driving the reader/writer, the signal processing circuit and so on, is provided at a rear face of the floppy disk unit 10 which is opposite side of the front face in which the slot is provided. Also, the male connector terminal 13 for communicating to a computer unit by transmitting and receiving signals is provided at the rear face of the floppy disk unit 10.

The floppy disk unit 10 is mounted on the computer unit, and a first female connector terminal 31 provided at one end of a flat cable 30 is connected to the male connector terminal 13. A second female connector terminal 31 is provided at the other end of the flat cable 30 which is opposite of the one end thereof adapted to be connected to the floppy disk unit 10. Both female connector terminals 31 are respectively connected to the floppy disk unit 10 and the computer unit.

FIG. 2A shows a structure of a terminal face of each of the female connector terminals 31 provided at the flat cable 30. More specifically, as shown in FIG. 2, the female connector terminal 31 includes a plurality of terminal hole pairs 42 each comprising a signal terminal hole 40 and an earth terminal hole 41, and the plurality of terminal hole pairs 42 are arranged in a direction perpendicular to the direction of arrangement of the signal terminal hole 40 and the earth terminal hole 41 of the terminal hole pairs 42.

As shown in FIG. 4, the related male connector terminal 100 has signal terminal pins 51 corresponding respectively to the signal terminal holes 40 and earth terminal pins 52 corresponding respectively to the earth terminal holes 41 of the female connector terminal 31.

However, with the recent widespread use of computer units, it has been increasingly desired to reduce the cost of a floppy disk unit, and it has been required to reduce the cost of component parts of the floppy disk unit. The male connector terminal mounted on the floppy disk unit has room for improvement in the cost.

SUMMARY OF THE INVENTION

It is therefore an object of the present invention to provide a male connector terminal, in which the number of component parts can be reduced so as to achieve the reduction in cost thereof.

In order to achieve the above object, according to the present invention, there is provided a male connector connected to a female connector in which a plurality of terminal hole pairs, each including a signal terminal hole and an earth terminal hole are arranged in a first direction, and the plurality of terminal hole pairs are arranged on the female connector body in a second direction perpendicular to the first direction, the male connector comprising:

a male connector body;

a plurality of signal terminal pins, provided on the male connector body, and accommodated in the signal terminal holes respectively; and a plurality of earth terminal pins, provided on the male connector body, and accommodated in the earth terminal holes, the earth terminal pins being smaller in number than the earth terminal holes of the female connector.

Preferably, the plurality of earth terminal pins are arranged on the male connector body so as to be accommodated in at least earth terminal holes situated at both ends of the second direction.

Preferably, the male connector further comprises a plurality of connection terminals, provided on a first face of the male connector body which is mounted on an external member, and electrically connected to the signal terminal pins and the earth terminal pins respectively.

Here, it is preferable that, the male connector further comprises at least one dummy terminal, provided on the first face of the male connector body, without being electrically connected to any terminal pins.

According to the present invention, there is also provided a method of manufacturing a male connector connected to a female connector in which a plurality of terminal hole pairs, each including a signal terminal hole and an earth terminal hole are arranged in a first direction, and the plurality of terminal hole pairs are arranged on the female connector body in a second direction perpendicular to the first direction, the manufacturing method comprising the steps of:

providing a male connector body;

determining a minimum number of earth terminal pins so that a desired grounding function can be realized; and determining a minimum number of connection terminals so that a desired connection strength between the male connector body and an external member on which the male connector is mounted can be secured; assembling the minimum number of the earth terminal pins and the minimum number of the connection terminals on the male connector body.

The male connector terminal of the present invention can be used for connecting to the female connector terminal, and the reduction in cost thereof can be achieved by reducing the number of the earth terminal pins.

Therefore, when the male connector terminal of the present invention is used, for example, as a connector terminal mounted on a floppy disk unit, it can contribute to the reduction in the overall cost of the floppy disk unit.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Preferred embodiments of the present invention will be described below in detail with reference to the drawings.

Figure 1:
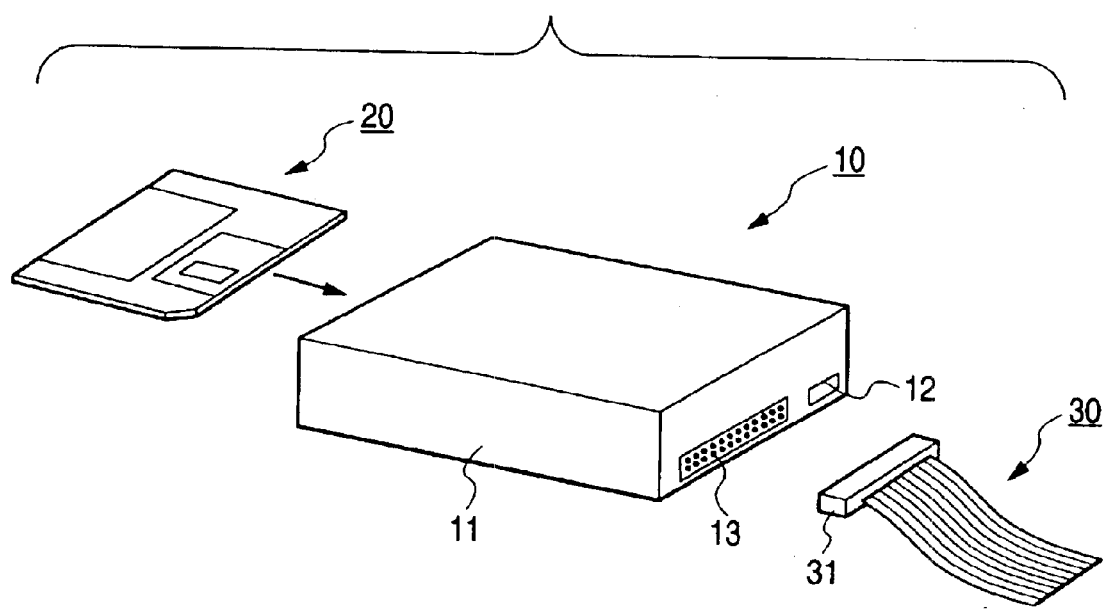
FIG. 1 is a schematic view showing a floppy disk unit on which a male connector terminal of the present invention is mounted.
Figure 2:
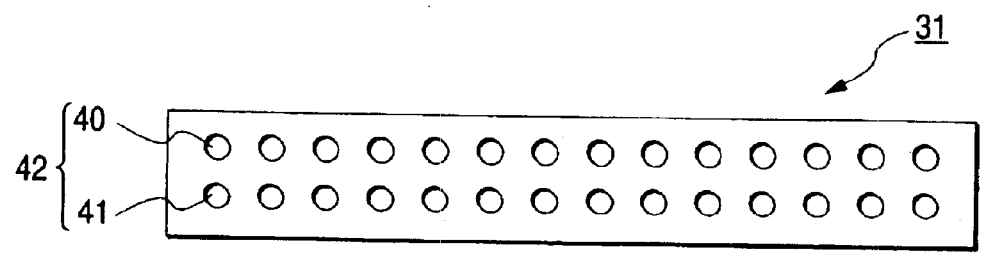
FIG. 2 is a schematic view showing a terminal face of a female connector terminal connected to the male connector terminal of the present invention.
Figure 3A:
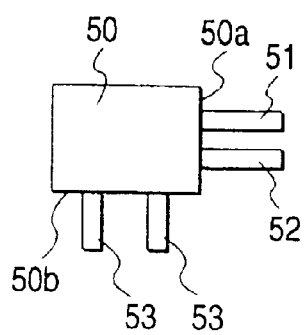
FIG. 3A is a side view showing the male connector terminal according to one preferred embodiment of the present invention.
Figure 3B:
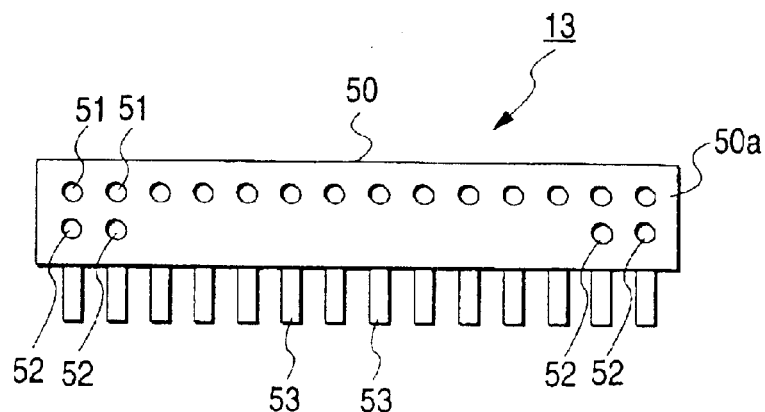
FIG. 3B is a front view showing a terminal face of the male connector terminal according to the one preferred embodiment of the present invention.
Figure 4A:
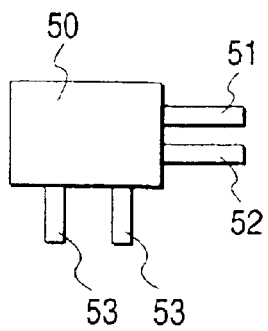
FIG. 4A is a side view showing a related male connector terminal.
Figure 4B:
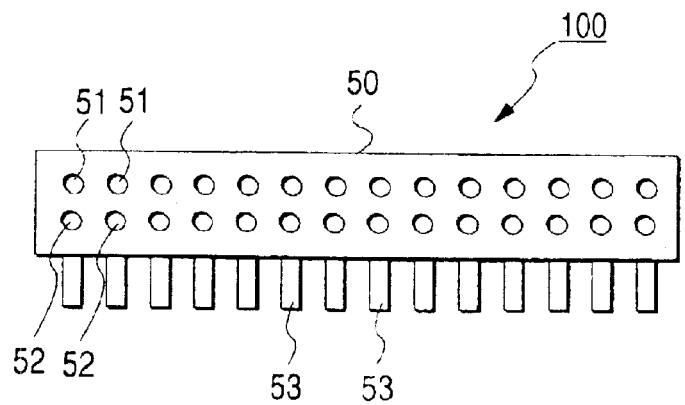
FIG. 4B is a front view showing a terminal face of the related male connector terminal.

FIGS. 3A and 3B show a structure of the male connector terminal 13 according to the one preferred embodiment of the present invention, the male connector terminal 13 is mounted on the floppy disk unit 10. FIG. 3A shows a side view of the male connector terminal 13, and FIG. 3B shows a front view of a terminal face of the male connector terminal 13.

Namely, as shown in FIGS. 3A and 3B, the male connector terminal 13 includes a plurality of signal terminal pins 51 and a plurality of earth terminal pins 52 which are provided at the terminal face 50a of a terminal body 50. The plurality of signal terminal pins 51 is disposed respectively at positions corresponding to the signal terminal holes 40 of the female connector terminal 31. The plurality of earth terminal pins 52 are disposed at positions corresponding to the earth terminal holes 41 of the female connector terminal 31, and are smaller in number than the earth terminal holes 41. A plurality of connection terminals 53 for connecting to the unit body 11 of the floppy disk unit 10 are provided at a bottom face 50b of the male connector terminal 13 disposed adjacent to the terminal face 50a of the terminal body 50. The connection terminals 53 are electrically connected to the signal terminal pins 51 and the earth terminal pins 52 respectively.

The male connector terminal 13 according to this embodiment of the invention has the earth terminal pins 52 which are provided so as to correspond to part of the earth terminal holes 41 of the female connector terminal 31, and the number of the earth terminal pins 52 of the male connector terminal 13 is smaller than the number of the earth terminals pins of the related connector terminal 100.

Therefore, in the male connector terminal 13, the cost of the material can be reduced by an amount corresponding to the number of the omitted earth terminal pins 52 as compared with the related male connector terminal 100. Also, the time and process required for inserting the earth terminal pins 52 into the terminal body 50 during the production can be reduced. Therefore, the reduction in cost of the male connector terminal 13 can be achieved.

Also, the plurality of earth terminal holes 41 in the female connector terminal 31 are used as the earth, and therefore even in the case where the earth terminal pins 52 is reduced into a smaller number as compared with the related male connector terminal 100, the grounding by the earth terminal pins 52 of the male connector terminal 13 in the floppy disk unit 10 can be used commonly. Therefore, the number of the earth terminal pins 52 of the male connector terminal 13 can be reduced smaller than the number of the earth terminal pins 52 of the related male connector terminal 100. Namely, the number of the earth terminal pins 52 to be omitted of the male connector terminal 13 is determined such that the grounding function of the earth terminal can be realized.

In the male connector terminal 13, although the number of reduction of the earth terminal pins 52, as well as the positions of the omitted earth terminal pins 52, are not particularly limited, it is preferred that those of the earth terminal pins 52, corresponding to central ones of the earth terminal holes 41 in the female connector terminal 31, be omitted while only the earth terminal pins 52, corresponding to those of the earth terminal holes 41 disposed at the opposite end portions of the female connector terminal, are provided. With this arrangement, the positioning of the terminal pins relative to the terminal holes can be effected easily, and besides the connection of the male connector terminal to the flat cable 30 can be effected positively.

As shown in FIGS. 3A and 3B, the connection terminals 53 of the male connector terminal 13 for connecting to the unit body 11 of the floppy disk unit 10 are mounted on the bottom face 50b of the terminal body 50. However, the connection terminals 53 corresponding to the omitted earth terminal pins 52 are not electrically connected to the earth terminal pins 52. Therefore, the connection terminals 53 corresponding to the omitted earth terminal pins 52 can be also omitted if the sufficient connection strength of the male connector terminal 13 to the floppy disk unit 10 is secured. By thus reducing the number of the connection terminals 53, the cost of the male connector terminals 13 can be further reduced.

Since it is not necessary to electrically connect the earth terminal pin 52 with the connection terminals 53 of the male connector terminal 13 corresponding to the omitted earth terminal pins 52, instead of the connection terminals 53, dummy terminals, which are made of reasonable material, may be arranged in number so as to secure the sufficient connection strength of the male connector terminal 13 to the floppy disk unit 10. Accordingly, the cost of the male connector terminals 13 can be further reduced. Incidentally, any configurations may be adopted for the dummy terminal if the sufficient connection strength of the male connector terminal 13 to the floppy disk unit 10 can be secured.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A male connector for connection to a female connector in which a plurality of terminal hole pairs, each including a signal terminal hole and an earth terminal hole are arranged in a first direction, and the plurality of terminal hole pairs are arranged on the female connector body in a second direction perpendicular to the first direction, the male connector comprising:
   a male connector body;
   a plurality of signal terminal pins, provided on the male connector body, and accommodated in the signal terminal holes respectively; and
   a plurality of earth terminal pins, provided on the male connector body, and accommodated in the earth terminal holes, the earth terminal pins being smaller in number than the earth terminal holes of the female connector.

2. The male connector as set forth in claim 1, wherein the plurality of earth terminal pins are arranged on the male connector body so as to be accommodated in only the earth terminal holes situated at both ends of the second direction.

3. The male connector as set forth in claim 1, further comprising a plurality of connection terminals, provided on a first face of the male connector body which is mounted on an external member, and electrically connected to the plurality of signal terminal pins and the earth terminal pins respectively.

4. The male connector as set forth in claim 3, further comprising at least one dummy terminal, provided on the first face of the male connector body, without being electrically connected to any terminal pins.

5. A method of manufacturing a male connector for connection to a female connector in which a plurality of terminal hole pairs, each including a signal terminal hole and an earth terminal hole are arranged in a first direction, and the plurality of terminal hole pairs are arranged on the female connector body in a second direction perpendicular to the first direction, the manufacturing method of comprising the steps of;
   providing a male connector body;
   determining a minimum number of earth terminal pins so that a desired grounding function can be realized; and
   determining a minimum number of signal terminal pins so that a desired connection strength between the male connector body and an external member on which the male connector is mounted can be secured;
   assembling the minimum number of the earth terminal pins and the minimum number of the signal terminal pins on the male connector body;
   wherein the minimum number of earth terminal pins is less than the number of earth terminal holes in the female connector.

6. The method of claim 5, wherein the earth terminal pins are assembled such that the earth terminal pins are accommodated in only the earth terminal holes in the female connector situated at both ends of the second direction.

7. The method of claim 5, further comprising the step of assembling at least one dummy terminal that is not connected to any terminal pins.

* * * * *